Aug. 19, 1924.

R. BÜGLER ET AL 1,505,582

TIME RECORDER

Filed Sept. 1, 1921

Inventors
Richard Bügler, and
Hermann Voigt
by Knight Bros
attorneys

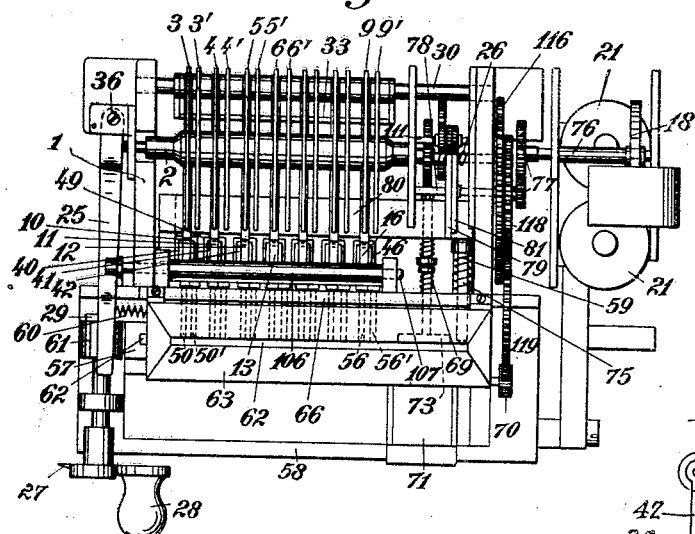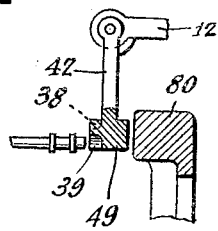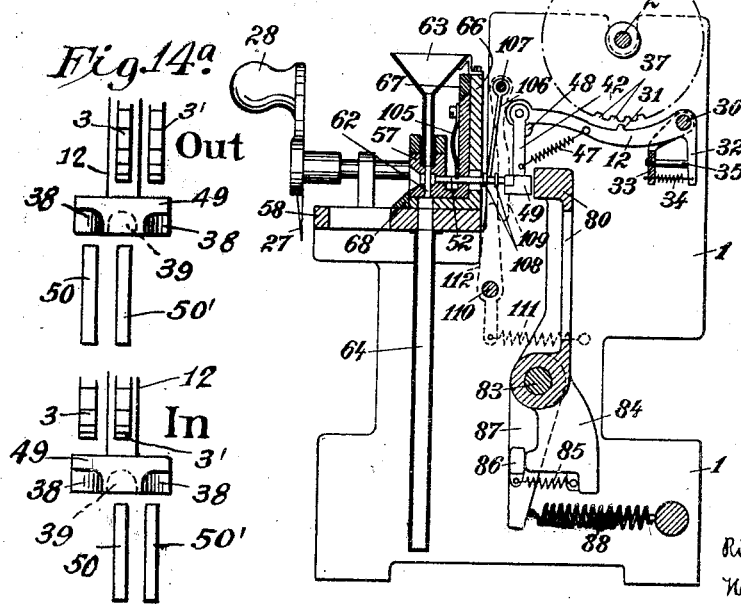

Aug. 19, 1924.  R. BÜGLER ET AL  1,505,582
TIME RECORDER
Filed Sept. 1, 1921  6 Sheets-Sheet 3

Inventors
Richard Bügler, and
Hermann Voigt
by Knight Bro
Attorneys

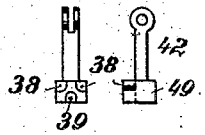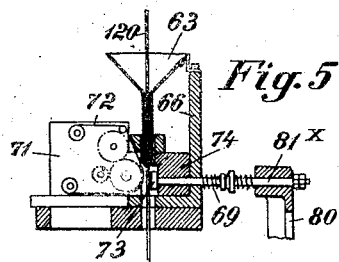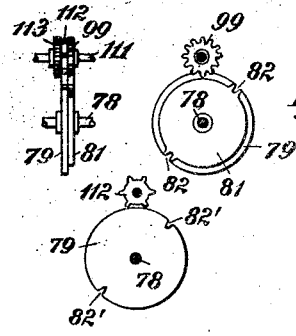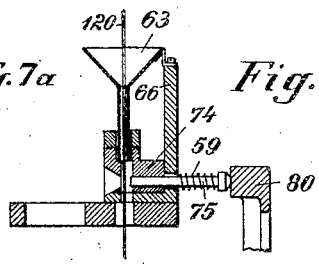

Aug. 19, 1924.　　　　　R. BUGLER ET AL　　　　　1,505,582
TIME RECORDER
Filed Sept. 1, 1921　　　6 Sheets-Sheet 5
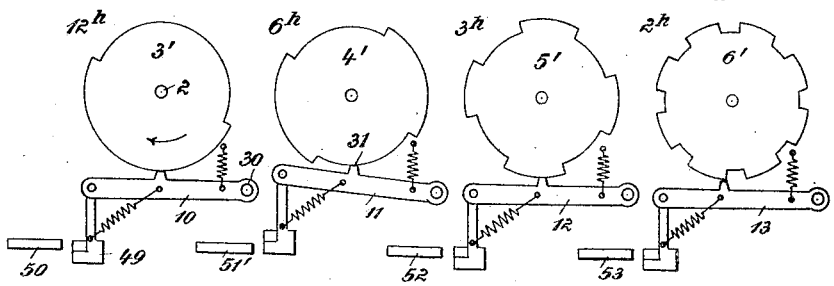
Entrance-time 7ʰ 43 min. forenoon (Peforation 7ʰ 30 min.)
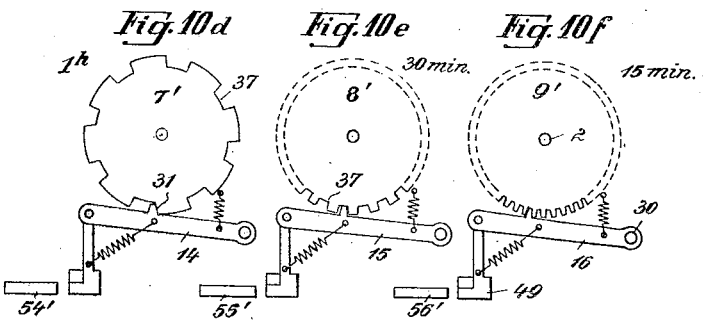
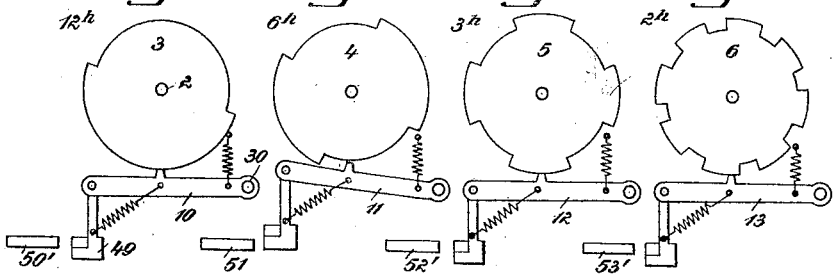
Going-out time 7ʰ 25 min. forenoon (Perforation 7ʰ 15 min.)
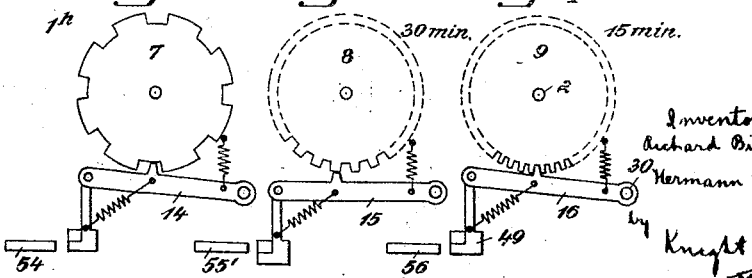
Inventors
Richard Bugler, +
Hermann Voigt
by Knight Bro?
Attorneys

Patented Aug. 19, 1924.

1,505,582

UNITED STATES PATENT OFFICE.

RICHARD BÜGLER, OF CHARLOTTENBURG, AND HERMANN VOIGT, OF SIEMENSSTADT, NEAR BERLIN, GERMANY, ASSIGNORS TO SIEMENS & HALSKE AKTIENGESELLSCHAFT, OF SIEMENSSTADT, NEAR BERLIN, GERMANY, A CORPORATION OF GERMANY.

TIME RECORDER.

Application filed September 1, 1921. Serial No. 497,676.

*To all whom it may concern:*

Be it known that we, RICHARD BÜGLER and HERMANN VOIGT, both citizens of the German Empire, and residents, respectively, of Charlottenburg and Siemensstadt, near Berlin, Germany, have invented certain new and useful Improvements in Time Recorders (for which we have filed applications in Germany 10.4.1916, Pat. Nr. 326051; Belgium, 29.1.1918, Pat. Nr. 272995; Norway, 22.12.17, Pat. 31238; Denmark, 6.12.1917, Pat. Nr. 24409; France, 13.12.1917, Pat. Nr. 515090; Italy, 28.12. 1917, Pat. Nr. 509–65/164–459; Holland, 10.1.1918, Pat. Nr. 3999; Sweden, 6.12.1917, Ser. Nr. 4024/17; Switzerland, 3.12.1917, Pat. Nr. 78728; Hungary, 13.12.1917, Pat. Nr. 72897; Turkey, 30.12.1917, Pat. Nr. 2784; Poland, 10.7.1920, Ser. Nr. 10948; Austria, 7.4.1917, Ser. Nr. A 1597/17; Czechoslovakia, 20.6.1920, Ser. Nr. 4608/20, of which the following is a specification.

Our invention has reference to means for checking workmen's time and relates more particularly to means for checking time by cards which are inserted into a machine and marked in accordance with the times to be recorded. The cards are introduced into the apparatus each time the workman arrives or leaves, and by the movements of a handle or automatically, the marking corresponding to the time is effected, in accordance with a clock.

In known arrangements of this kind a time stamp is adjusted by means of the clock and is pressed against the card, the indication of the workman's arrival or leaving being obtained by putting the card into one of two different positions through the movement of an operating lever. In certain of such arrangements the calculation or reckoning of the working time in accordance with the marked cards is often troublesome, since in practical working, the actual times are not always reckoned by. For instance in the case of an arrival, only the beginning of the next quarter of an hour is taken into account, and on leaving, the end of the previous quarter of an hour.

In some cases however the card has been punched in accordance with the time on arrival and on departure, and the holes have been used to set mechanism for printing lapsed time. Moreover mechanism has been provided in such time-recorders, for taking account of "dead" times, such as meal times, etc., besides which the mechanism has been arranged to clip the edge of the card so that it takes up a new position each time it is inserted in the machine.

According to our present invention the time is indicated on a card, having columns of divisions and spaces, each column corresponding to a definite time value. The indication is effected not direct by a time-stamp or the like, but by one or more single marks which illustrate by symbols the real time according to their position and number on the card. These marks also by their positions in the spaces or divisions determine whether the values represented are positive or negative. Perforations, indentations or printed devices may be employed, as the indicator symbols or marks, as distinguished from numerals giving the actual or clock figures. Perforations however have the advantage that the cards may easily be totalled up by means of adding machines adapted to deal with perforated records.

The accompanying diagrammatic drawings illustrate one construction of apparatus, Fig. 1 being a front elevation of an improved time punching apparatus, whilst Fig. 2 is a plan thereof, certain parts being removed.

Figs. 4 to 6 are sections taken vertically in different planes.

Figs. 7, 7ª and 7ᵇ illustrate different views of a detail of construction.

Figs. 8 and 8ª two views of another detail, and

Fig. 9 shows a specimen of a workman's card.

Figs. 10, and 10ª to 10ᶠ show the different discs for controlling the pressing stamp when about to mark a definite time of arrival.

Figs. 11, 11ª to 11ᶠ show the discs which serve for perforating a definite time of departure.

Figure 12:
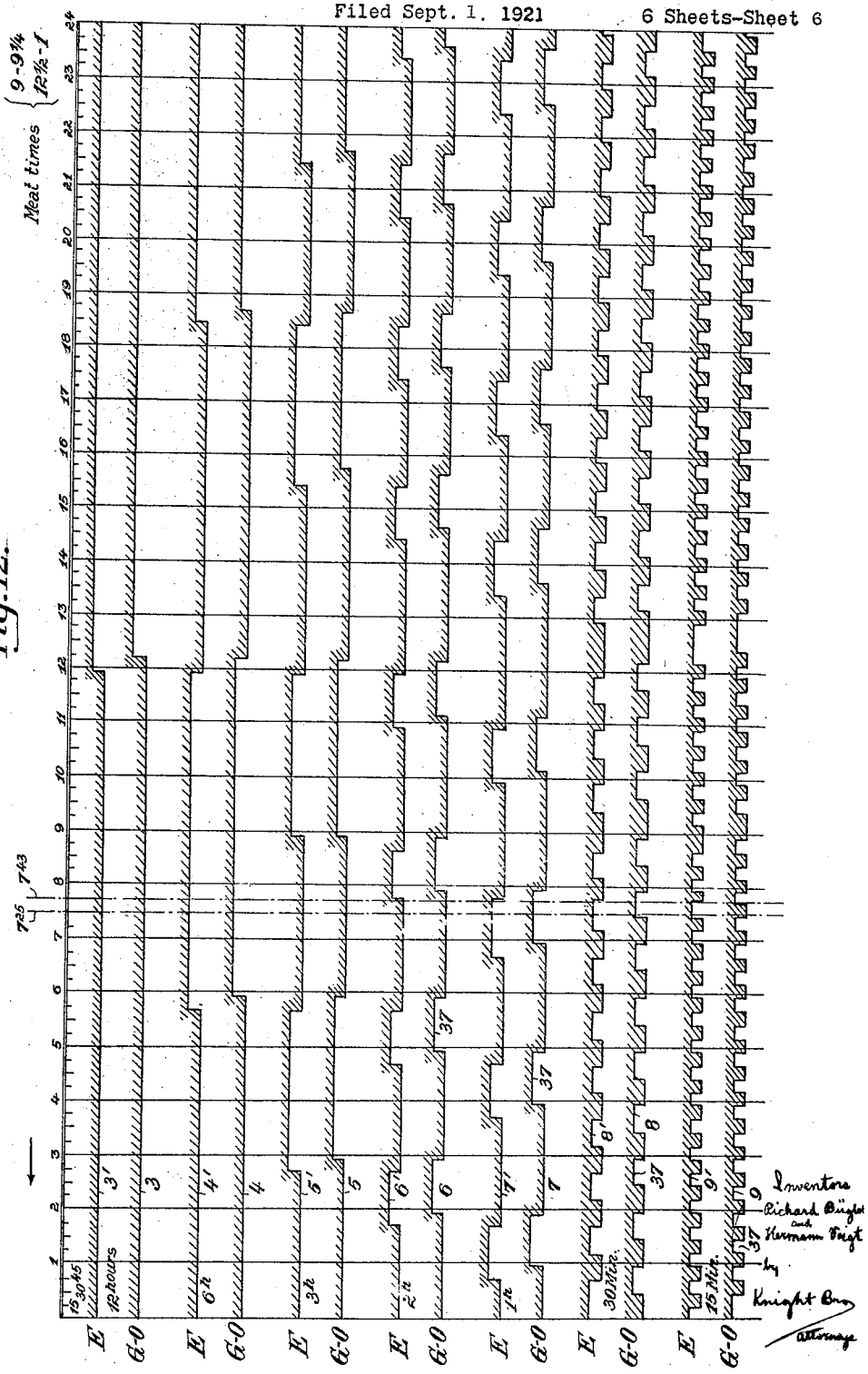

Fig. 12 illustrates a development of the whole of the discs.

Figure 1:
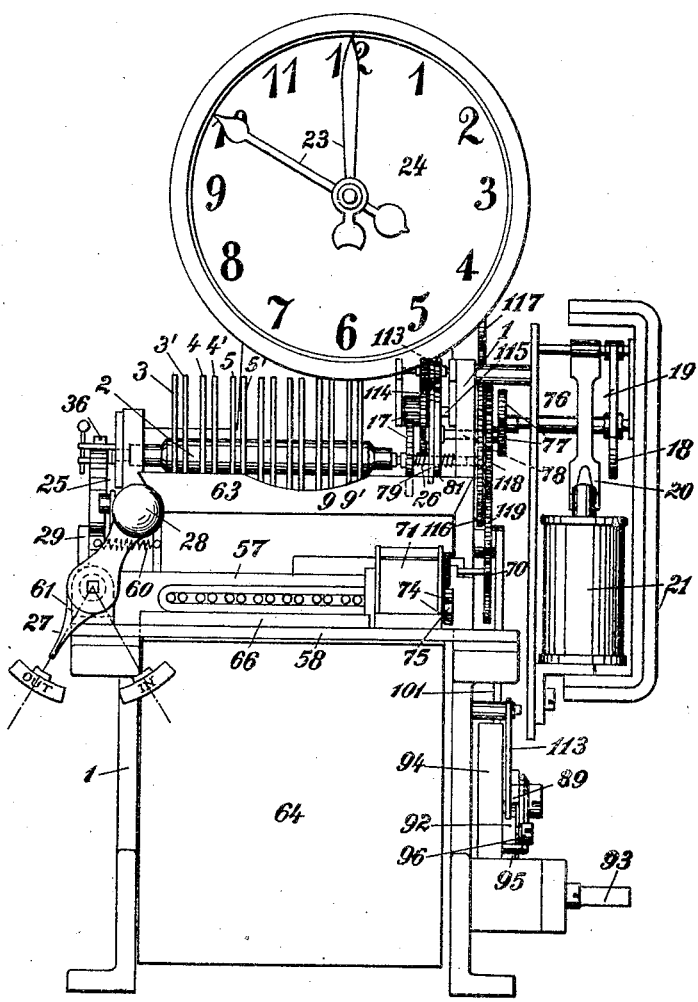
Figure 13:
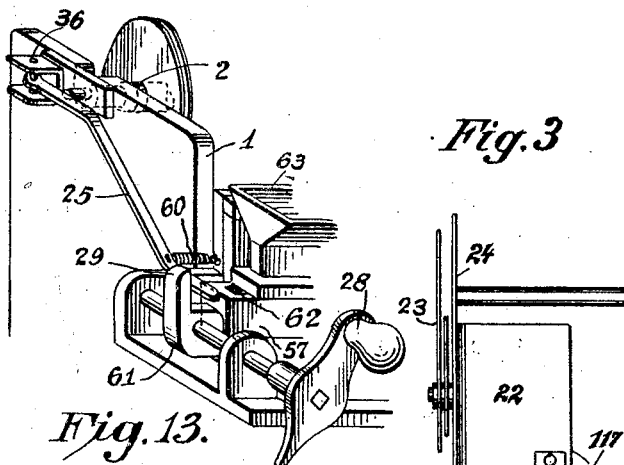

Fig. 13 is a perspective view in enlarged scale of the left hand portion of the apparatus shown in Fig. 1, illustrating in detail the lever for shifting the discs driven by the clockwork.

Figs. 14ª and 14ᵇ are two front elevations in enlarged scale of the central portion of the apparatus shown in Fig. 4, illustrating the two positions of the punches and the discs with respect to one of the intermediate blocks.

Fig. 14ᶜ shows in the same scale a side elevation of such a block with the punch and the beating head, the same as it appears in smaller scale in Fig. 4.

In a frame or stand 1 (Figs. 1 and 2) is mounted a shaft 2 on which are arranged fourteen discs 3, 3¹ up to 9, 9¹ provided on the circumference with different indentations the discs of each pair, for example 3 and 3¹, being placed in close proximity to one another.

In Fig. 12 the developments of all the discs are shown. In this figure also the discs fixed closely adjoining one another are shown correspondingly closer together. The vertical lines show the times of day. The spaces of the indentations on the circumferences of the discs is such that the particular teeth or indentations required at the moment lie at the different angles which are indicated in Fig. 12 by the vertical hour line. The discs 9 and 9¹ in the case of a normal division have 48 teeth and 48 indentations or gaps, corresponding to the 96 quarter hours of a day. The discs 8 and 8¹ have 24 teeth and 24 gaps corresponding to the 48 half hours. The discs 3 and 3¹ have only one tooth and one gap, the discs 4 and 4¹ have two of each. These and also the rest of the discs are thus divided in accordance with the hour values 12, 6, 3, 2, 1 and the minute values 30 and 15. With these values the whole of the time values of the day can be made up into full quarters of an hour. The discs are mounted on the shaft 2 in such a manner that their teeth are slightly in advance—perhaps a minute—of the clock time, so that for the full quarter hour values on which the working times are reckoned, the symbol corresponding to the starting quarter hour is produced with certainty. The discs 3¹ to 9¹ serve for stamping the time of arrival of the workman; the discs 3 to 9 for producing the perforated symbol on leaving. They are spaced apart relatively to one another to the extent of the value of a quarter of an hour, that is to the extent of one tooth of the discs 9 9¹. The object of this is to mark for the arrival, the beginning of the following quarter of an hour and for the leaving, the last quarter hour.

The shaft 2 is movable endwise, so that either disc of each pair can be brought opposite a set of cog levers 10 to 16 (12 in Fig. 4).

The shaft 2 is connected by means of a toothed gear with a driving wheel 18 of an auxiliary clock mechanism, which wheel is actuated through the medium of pawls 19 by the armature 20 of an electro-magnet 21. This magnet is connected with a clock-mechanism and has a current impulse imparted to it every minute, whereby the shaft 2 is thus moved forward or actuated every quarter of an hour.

For this purpose the mechanism is arranged as follows:—A shaft 76 fixed to the wheel 18 drives a shaft 78 on which two discs 79, 81 are secured close together. These discs are illustrated separately in edge view and side elevation respectively in Figs. 7 and 7ª.

The disc 81 has two pairs of teeth between which are two diametrically-opposite gaps 82.

When the disc is rotated these teeth come into engagement with a toothed wheel 99 mounted on a shaft 111, so that at each revolution of the disc, the toothed wheel is actuated twice to the extent of two teeth. In order that the said shaft shall remain stationary during the intervals, a second toothed wheel 112 is provided thereon, the teeth of which press upon the edge of the disc 79, the actuation or rotary steps of the shaft being however permitted by means of gaps 82¹ corresponding to the gaps 82 in the disc 81. In fact the discs 79 and 81 work practically like a Maltese-cross driving arrangement.

Finally on the shaft 111 a toothed wheel 113 is mounted which is in engagement with a toothed wheel 114. This latter is mounted on a shaft 115 which (by means of a toothed wheel gear 17 movable in the axial direction) is coupled with the shaft 2 carrying the discs 3 to 9¹. In consequence of this arrangement of the toothed wheel gear, the discs are actuated every quarter of an hour, so that in this interval different combinations of the circumferential recesses can be brought into play, the discs and their connected parts forming in fact a timing gear.

Figure 3:
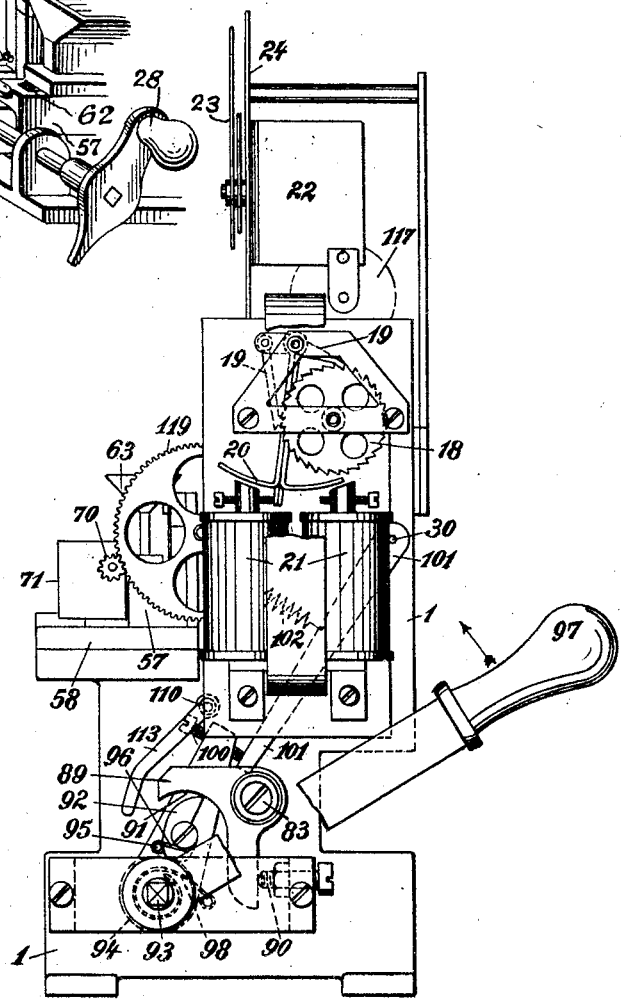
Fig. 3 is a side elevation thereof, partly in section.

The motion-wheel 18 also actuates a clockwork 22, the pointers 23 of which move over a dial plate 24. For this purpose the shaft 78 has mounted on it a toothed wheel 116 which by means of a toothed wheel 117 (Figs. 1 and 3) actuates the driving wheels of the clock-work 22.

The longitudinal movement of the shaft 2 with the timing discs 3, 3¹, to 9, 9¹, is effected at one end by means of a lever 25 mounted on a pin 36 belonging to the frame, and at the other end by means of a spring 26 (Figs. 1, 2 and 13). The spring has a tendency to retain the shaft in the left end position. The lever 25 actuates it towards the right, as shown in Figs. 1 and 2, as soon as it is turned down by means of a handle 28 provided with a pointer 27 and a lever 29 which is actuated by the said handle, being secured to the axle of the latter.

The levers 10 to 16 are rotably mounted on a shaft 30 (Fig. 4). Each of them is provided with a cog or nib 31 which when the lever moves upwards, lies against the circumference of the opposite one of the discs 3—$9^1$, or in a recess or gap 37 therein. The levers 10 to 16 are provided with extensions 32. Between these and a bar 33 secured to the shaft 30, springs 34 are arranged. These springs have a tendency to press the levers 10 upwards against the discs 3 to $9^1$. Stops 35 provided on the bar 33 however prevent the cogs 31 coming in contact with the discs when the apparatus is at rest. The effect of this is quarter-hourly actuation of the discs without any friction on the cogs.

The levers 10 to 16 have linked to their free ends, intermediate pieces 40 to 46 (42 in Fig. 4), which in the condition of rest are held against stops 48 on the levers by means of springs 47. The intermediate pieces terminate in blocks 49 which are illustrated in Figs. 8 and $8^a$ in front and side elevation. The front faces are provided with two external recesses 38 and with a central and somewhat deeper recess 39. Opposite the blocks 49 are fourteen horizontally arranged stamps 50, $50^1$ to 56, $56^1$ (see Figs. 2 and 4). The stamps are mounted on their guide bar 57 in such a manner that they work through the same. The bar is movable transversely in guides 66, 67, 68 on a table 58 to such an extent that of the pairs of stamps or punches 50, $50^1$ to 56, $56^1$, either the one or the other comes in front of the middle of the block. A spring 60 tends to hold the bar 57 in the left end position. By means of the handle 28 and a cam 61 arranged on the spindle thereof (Figs. 1 and 13) it can be moved into the right-hand position. Consequently the movements of the bar 57 and of the shaft 2 are effected simultaneously and in opposite directions.

In the bar 57 and the table 58 is a perpendicular slot 62 above which a hopper 63 for the workman's card is secured on the guide bar 66, whilst beneath it is a corresponding guide piece 64.

From the shaft 78 which is driven by the motion wheel 18 of the auxiliary clock, a time printing mechanism 71 is actuated every minute by gearing 118, 119, 70 (Figs. 1, 2, 3 and 5). This mechanism 71 shows the time in hours and minutes, morning and afternoon being separately indicated. The printing mechanism stands opposite part of the workman's card 120 (Fig. 5) introduced into the hopper 63, an ink-band 72 being laid between. At this point, behind the card, a movable printing or pressing piece 73 is arranged. In the guide 74 which receives this printing piece a further stamp or punch 75 is mounted (Figs. 1, 2 and 6) which serves to clip a piece off the edge of the card at each operation. Accordingly the lower card guide 64 is narrower, by the amount of this clipped off piece, than the hopper 63, so that the card which is put in at any time can only be inserted as far as the upper end of the clipped portion.

The whole operating movement of the stamps 50, $50^1$, to 56, $56^1$, of the printing piece 73 and of the stamp 75, is effected by means of the top bar of a frame 80 (Figs. 2 and 4) which lies directly against the block 49 and the stamp 75 and against the printing piece or plunger 73, through the medium of a resilient stop $81^x$.

The operating bar or frame 80 is mounted on a strong shaft 83. By means of a spring 85 secured to a tail or extension 84, it is pressed against a stop 86 belonging to a lever 87 mounted on the shaft 83.

A spring 88 secured to the stand 1 and to the lever 87 holds the shaft 83 ordinarily in a position (see Fig. 3) in which a bent lever 89, mounted on the end of shaft 83, lies against a stop 90. The stamp frame 80 lies opposite the blocks 49 loosely or with a slight clearance.

The actuation of the frame 80 is effected, by means of the bell-crank lever 89. For this purpose the lever is provided with a recess or cavity 91 along which a rotary cam 92 can move. This cam is rotatably mounted on a lever 94 which is fixed to a shaft 93. When in the position of rest the cam lies firmly against a pin 95 under the action of a spring 96. The shaft 93 bearing the lever 94 is rigidly connected to a handle 97 and can be moved counter to a powerful spiral spring 98 in the direction indicated by the arrow, so that through the medium of the cam 92 in the groove or recess 91, it raises the lever 89 and thereby turns the shaft 83 and the bar 80 under a powerful tension of the spring 88. At a particular moment the cam 92 clears the groove 91, the shaft 83 is released, and the spring 88 pulls back the shaft and the frame. The bar 80, which in consequence of its being coupled with the shaft 83 through the spring 85 has a certain freedom of movement, and in consequence of its inertia, strikes against the whole of the stamps and the printing device, and forces them through or against the workman's card which is in the slot.

The lever 94 likewise serves for adjusting the stamps. For this purpose it is provided with an adjustable screw-stop 100 (Fig. 3), against which a lever 101 secured to the shaft 30 is drawn by a spring 102. When the handle 97 is operated, the lever 101 is moved upward by the spring 102, and the stop bar 33 (Fig. 4) secured to the shaft 30, rotates so that the cogs 31 of the levers 10 to 16 are pressed by the springs 34 against the clock-adjusted timing discs 3, 3¹, to 9, 9¹, lying opposite to them at the time.

If recesses 37 in the discs are opposite the cogs 31, the corresponding blocks 49 reach a different level from the other blocks. Thus either the front surface of the block or one of these recesses 38 or 39 will be opposite the pair of stamps (50, 50¹ to 56, 56¹) which co-operate with the block. Consequently on the movement of the stamp bar or frame 80, only one or the other stamp of each pair is set in motion. The return movement of the stamps 50 to 56¹ is effected by means of springs 105 (Fig. 4) fixed to the guide piece 66.

In case one of these springs 105 should break, or the stamp should by any means stick or jam, a further device is provided for returning the stamps, consisting of a metal plate 106 (Fig. 4) which extends along all the stamps. This plate is mounted on a shaft 107, and its free edge engages between two collars 108 belonging to the stamps. With the shaft 107, a lever 109 is connected, which bears against a lever 112 mounted on a second shaft 110 and connected to a spring 111. The shaft 110 carries another lever 113 (Fig. 3), the free end of which is set in motion by the cams 92 on the hand lever 94, 97, as soon as this has left the recess or curve of the stamp lever 89, whereupon the stamping operation is completed. The return movement of the edge stamp 75 is effected by means of a spring 59, whilst that of the pressing piece 73 is effected by a spring 69.

The mode of reckoning from the perforations made in the workman's card is as follows:—

In the sample card shown in Fig. 9, seven columns of divisions are provided. These columns as marked along the top, correspond to the hour values, 12, 6, 3, 2, 1, and the minute values 30 and 15, the bearing of which is explained by Fig. 12. From these values the whole time for the 24 hours of a day can be built up, provided that with regard to the minutes, the quarter hours only are reckoned, as is usual with workman's time sheets. In this figure, the letters "A" and "E" at the beginning of the horizontal lines indicate "out" and "in," that is to say "departure" and "arrival," respectively, whilst the letters "N" and "V" at the ends of the lines indicate that the times represented by the markings are P. M. and A. M. respectively.

Hence the effective perforations which come in the same horizontal row, show the time, by the values of the respective columns. It may be explained that the effective perforations are those at the sides of the divisions. The middle perforations only serve for cancelling a division which otherwise would be left free, and hence a falsification of the indications on the card can not be effected by the subsequent perforation of one of these divisions.

A further space or column of the card (as shown on the right of Fig. 9) serves for the recording of the actual times simultaneously with the punchings, by means of the time printing mechanism 71 which is actuated each minute.

In the bottom or first line on the card shown, the time 7.43 a. m., is marked. Corresponding to this there is a hole in the 6-hour column, in the 1 hour column, and in the 30 and 15 minutes columns respectively, so that the total of these punched or indicated time values corresponds to the time, 7.45. These effective perforations are shown in black, the dummy or blind middle holes as circles.

As this stamping relates to the arrival of the workman, only the next complete quarter of an hour, from which as usual the wages are calculated, is marked.

Supposing the workman leaves the factory at 7 minutes past 12. The second line of divisions is punched only in the first column, corresponding to 12 hours, since on the workman leaving, it is only the previous quarter-hour which is reckoned. The meaning of the succeeding perforations will be seen from what is shown in Fig. 9. The figures and letters which appear outside the card show the symbolical value of the punchings or perforations.

The punchings moreover not only indicate the time, but also distinguish between the arrivals and departures of the workman, those for "arrival" being on the right side of the columns, and those for "leaving" on the left side. This renders it possible to easily add up on a card the whole of the times marked, by means of the perforations which lie one above the other. If for instance, the left-hand or departure punchings be counted as "plus," and the right-hand or "arrival" punchings be counted as "minus," the result is that in each column there is a record of a definite total positive or negative sum.

If these sums which are shown at the bottom of each column in Fig. 9, be added up, then multiplied singly by the corresponding time values at the top, and the products thus obtained be added together, the total number of hours (in the present instance 11, which is shown at the bottom of the card) is obtained.

The proper positioning of the rows of perforations, is determined by the shoulder 110 which is left after the clipping of the right-hand edge of the card at each stamping operation by the punch 75. Thus when the card is next inserted in the slot 62 as far as the stop, it goes one line lower. The distinctive punchings are due on the one hand to the vertical adjustment of the blocks 49, and on the other hand to the moving of the stamps or punches (50 to 56¹) in the horizontal direction. It may be explained that as the pointer 27 is put over the right-hand or left-hand position (viz, to "arrival" or "departure") by means of the knob or lever 28, the pairs of stamps 50, 50¹ up to 56, 56¹, take different positions relatively to the blocks 49. In the "arrival" position, the left-hand stamps lie in front of the middle of the blocks. In the departure position, the right-hand ones. According to these positions and the adjustment of the front faces (Fig. 8) of the blocks, each pair of stamps can thus only effect a middle punching, or a right-hand or left-hand perforation, each time. The effective perforations are therefore produced according to the position of the knob 28 on the "minus" or "plus" side.

The distinction between effective and ineffective or dummy punchings is determined by the height adjustment of the blocks 49. This adjustment depends upon whether or not the nose 31 of the levers 10 to 16 carrying the intermediate piece 40 with the block 49, stands opposite one of the recesses 37 (Fig. 4) in the corresponding timing discs 3, 3¹ to 9, 9¹. In case the cog or nose 31 drops into a recess, a dummy or blind punching is obtained, whereas if it rests on the disc edge an effective punching is produced.

The details of the operating mechanism controlling the dummy punching are as follows:

The punches 50—56¹ are guided in a frame 57, which is slidingly disposed to operate in a direction at right angles to the direction in which the punches operate. The frame is operated by means of handle 27, 28 with two positions "in" and "out" as shown in Figure 1, in accordance with which the frame is thrown either to the right or to the left. Disks 3—9¹ are also movable in the direction of their axes of rotation and are also shifted by means of handle 27—28 through the lever 25, in such manner that when the handle is thrown to the right, so that its pointer indicates "out," they are moved to the right into the position shown in Figure 1, whereas when the handle is thrown into the "in" position they are released and thrown to the left by means of a spring 26 provided at the right hand end of the disk shaft. The movement of the punches and the disks as referred to hereinbefore is such relatively to each other that when the disks move to the right the punches move to the left and vice versa, whereas the punch blocks 49, which operate the punches, remain stationary so far as lateral motion is concerned. Blocks 49 as shown in Figures 8 and 8ª are provided with recessed portions as indicated, so that when hammer 80 strikes the rear side of the blocks 49 only one of said punches pertaining to a particular block 49 will be operated, whereas the other does not partake in the motion on account of standing in line with a recess 38. Moreover inasmuch as the blocks 49 have a vertical motion, controlled by levers 12 to which they are linked, the punching of symbols or of a dummy mark will occur according to whether the particular block is raised or lowered. A dummy mark will be punched when the block is lowered, because in that case the portion of the block above the center recess 39 (Figure 8) abuts against the punch, whereas the other punch of this pair registers with one of the recesses 38 and therefore will not be operated. Consequently at every quarter hour, projections on the discs must come opposite the cogs 31, corresponding to those stamps which have to produce effective punchings. The circumferential division of the discs is arranged accordingly, as fully described in the explanation of Fig. 12.

The arrangement of double discs, and the moving of the same by means of the shaft 2, when the arrival and departure knob or handle 27, 28 is moved over, is intended (according as the punching is for arrival or departure) to bring one or other of the discs into the position for engaging the levers 10 to 16. The timing discs of each pair differ from one another in this respect, that on the right-hand discs 3¹ to 9¹ which come into effect in the arrival position, the recesses and the projections are so arranged that at the moment when there is a forward step equal to a quarter of an hour they are put ahead of the true time, whereas the left-hand discs 3 to 9 (which are intended for the departure position) agree with the time. Hence during the time of rest, they show arrears. By this arrangement the "arrival" punchings show the beginning of the next quarter of an hour, whilst those on "departure" show the time at which the actual quarter of an hour began.

The different positions of the time discs and levers shown in Figs. 10, 10ª to 10ᶠ serve for perforating the symbol which is shown lowest on the card in Fig. 9 and is intended for arrival of the workmen at 7.43 a. m.

In this connection the pointer 27 (Fig. 1) stands on the right, the left stamps 50 to 56 stand in front of the middle of the blocks 49 and the right discs 3¹ to 9¹ above the levers 10 to 16. The levers 11, 14, 15 and 16 must then fall with their noses in gaps 37 in the discs 4¹, 7¹, 8¹ and 9¹. The remainder of the levers rest on the edge of the disc and effect dummy perforations.

The example according to Figs. 11, 11ª to $11^f$ show the position of the time discs and levers for a perforation which corresponds to departure of the workman at 7.25 a. m. Effective perforations are made by means of the stamps 51, 54 and 56.

The deduction in the regular interruptions in the work such as breakfast or dinner times, is effected in the following manner:—
As Fig. 12 shows, on the disc 8, $8^1$, 9, $9^1$, corresponding to the minute values (on which meal-times at 9–9.15 a. m. and 12.30–1 p. m. are assumed) fixed gaps are deepened or enlarged. The other discs are also suitably formed, the letters E and G-O representing "entry" and "going-out" respectively. Thus the production of the following perforated symbols is effected.

| Time. | Departure. | Arrival. |
|---|---|---|
| 8.45 a. m. | 6+ 2+30+15 | 6+ 3 |
| 9   a. m. | 6+ 3 | 6+ 3 |
| 9.15 a. m. | 6+ 3 | 6+ 3+15 |
| 9.30 a. m. | 6+ 3+15 | 6+ 3+30 |
| 12.15 p. m. | 12 | 12+15 |
| 12.30 p. m. | 12+15 | 12+15 |
| 12.45 p. m. | 12+15 | 12+15 |
| 1    p. m. | 12+15 | 12+30 |
| 1.15 p. m. | 12+30 | 12+30+15 |

From these values the rest can be easily calculated. On the card shown in Fig. 9 no notice is taken of intervals.

It will thus be understood that the recesses and projections on the disc 3 to 9 intended for the departure punching are arranged in arrear of the otherwise necessary time value to the extent of these interruptions, reckoning from the actual time at which the interruptions begin. When there is a half-hour breakfast-time, and a one-hour dinner time, it is necessary for example, that when the departure is at 4.8 o'clock, the symbol 2.30 be perforated. The form of the disc edges must therefore be arranged to allow for this, and for the other times which come after the interruptions or stoppages.

Having now particularly described and ascertained the nature of our said invention and in what manner the same is to be performed, we declare that what we claim is:—

1. Apparatus for checking time, by marking cards having columns of divisions and spaces, each column corresponding to a definite time value, and all the markings of a row of time values representing in symbolic manner the time to be marked, said apparatus comprising a clockwork, a rotatable controller having projections and recesses arranged on its circumference and being driven by said clockwork, a plurality of pairs of marking devices, a plurality of blocks adapted to be set by said controller, and working against the marking devices, an operating device working against said blocks, and means adapted to suitably shift the marking devices into different positions with respect to said blocks to move only one of the marking devices of each pair by the operating device, so that each of the markings is produced in a certain place of the corresponding space of the card thus producing either a symbolic marking of a time value or a dummy marking.

2. Apparatus for checking time by marking cards with columns of divisions and spaces, comprising a clockwork, a plurality of pairs of disks being shiftable in axial direction, and having projections and recesses arranged on each disk of said pairs in different manner corresponding to the different time value of entrance or exit of the operatives, a plurality of blocks adapted to be set by said disks, an operating device working against said blocks, a plurality of pairs of marking devices and means adapted to shift the marking devices and the pairs of disks into different positions with respect to said blocks in such a manner that only one of the marking devices of each pair is moved by the operating device in dependence of only one disk of each pair.

3. Apparatus for checking time by marking cards having columns of divisions and spaces, each column corresponding to a definite time value, and all the markings of a row of time values representing in symbolic manner the time to be marked, said apparatus comprising a plurality of disks shiftable in axial direction, and having projections and recesses, a plurality of blocks adapted to be set by said disks, a plurality of pairs of marking devices, projections and recesses on the front side of said blocks arranged opposite to the rear end of said marking devices, an operating device working against said blocks, and means adapted to shift the marking devices into different positions with respect to the recesses of said blocks in such a manner that only one of the marking devices of each pair is moved by the operating device so that each of the markings is produced in a certain place of the corresponding space of the card thus producing either a symbolic marking of a time value or a dummy marking.

4. Apparatus for checking time by marking cards having columns of divisions and spaces, comprising a clockwork, a plurality of disks having projections and recesses and being driven by said clockwork, a plurality of pairs of punches, a plurality of levers adapted to be set by said disks, blocks at the end of said levers, having recesses and projections at their front facing the rear ends of said punches, a hammerlike frame adapted to operate against all of the rear sides of said blocks, a spring for operating said frame, a handle adapted to tension said spring, and means adapted to shift the punches into different positions with respect to the projections and recesses of said blocks in such a manner that only one of the punches of each pair is moved by said frame so that each of the punch holes is produced in a certain place of the corresponding space of the cards thus producing either a symbolic marking of a time value or dummy marking.

5. Apparatus for checking time by marking cards having columns of divisions and spaces, comprising a clockwork, a plurality of disks having projections and recesses and being driven by said clockwork, a plurality of pairs of punches, a shaft, a plurality of levers pivoted on said shaft, blocks at the end of said levers having projections and recesses, springs connecting said levers with parts fixed to said shaft, an operating device working against said blocks, means for moving said levers against said disks when the operating device is moved, and means adapted to shift the punches into different positions with respect to the projections and recesses of said blocks in such a manner that only one of the punches of each pair is moved by the operating device, so that each of the punch holes is produced in a certain place of the corresponding space of the cards thus producing either a symbolic marking of a time value or a dummy marking.

6. Apparatus for checking time by marking cards, comprising an electromagnetic clock mechanism connectible to a master clock system, a plurality of disks having projections and recesses and being driven by said clockwork, a plurality of pairs of marking devices, a plurality of suitably shaped blocks adapted to be set by said disks and to operate against the marking devices, an operating device working against said blocks, and means adapted to shift the marking devices into different positions with respect to said blocks in such a manner that only one of the marking devices of each pair is moved by the operating device so that each of the markings is produced in a certain place of the corresponding space of the card thus producing either a symbolic marking of a time value or a dummy working.

7. Apparatus for checking time by marking cards having columns of divisions and spaces, each column corresponding with a definite time value, and all the markings of a row of time values representing in symbolic manner the time to be marked, said apparatus comprising a clockwork, a plurality of pairs of disks having projections and recesses on their rim arranged on each disk of said pairs in different manner corresponding to the different time values of entrance or exit of the operatives, a plurality of suitably shaped blocks adapted to be set by said disks, an operating device working against parts of said levers, a plurality of pairs of punches actuated by said blocks, a lever adapted to laterally shift said disks and said punches at the same time in opposite directions, a handle operating said lever and a pointer connected to said handle and showing the setting of the apparatus for entrance or exit of the operatives.

8. Apparatus for checking time by marking cards having columns of divisions and spaces, comprising a clockwork, a plurality of disks driven by said clockwork and having projections and recesses on their rim disks corresponding to the time values of the individual columns, and having projections or recesses of larger extent between the other aforementioned projections and recesses and corresponding to normal intermissions of work, a plurality of pairs of marking devices, a plurality of levers adapted to be set by said disks, an operating device working against parts of said levers, and means adapted to shift the marking devices into different positions with respect to said levers.

In testimony whereof we affix our signatures.

RICHARD BÜGLER.
HERMANN VOIGT.